(12) United States Patent
Meschkat

(10) Patent No.: US 9,275,147 B2
(45) Date of Patent: Mar. 1, 2016

(54) PROVIDING QUERY SUGGESTIONS

(75) Inventor: Steffen Meschkat, Zurich (CH)

(73) Assignee: GOOGLE INC., Mountain View, CA (US)

(*) Notice: Subject to any disclaimer, the term of this patent is extended or adjusted under 35 U.S.C. 154(b) by 140 days.

(21) Appl. No.: 13/525,524

(22) Filed: Jun. 18, 2012

(65) Prior Publication Data

US 2013/0339380 A1 Dec. 19, 2013

(51) Int. Cl.
*G06F 17/30* (2006.01)

(52) U.S. Cl.
CPC ...... *G06F 17/30864* (2013.01); *G06F 17/3064* (2013.01)

(58) Field of Classification Search
CPC .................. G06F 17/3064; G06F 17/30864
USPC .......................... 707/724, 730, 767
See application file for complete search history.

(56) References Cited

U.S. PATENT DOCUMENTS

| | | | |
|---|---|---|---|
| 7,685,119 B2* | 3/2010 | Riise et al. | 707/999.005 |
| 8,001,113 B2* | 8/2011 | Carnahan | 707/719 |
| 8,260,771 B1* | 9/2012 | Ortega et al. | 707/723 |
| 8,504,582 B2* | 8/2013 | Soetarman | 707/760 |
| 8,589,429 B1* | 11/2013 | Thirumalai et al. | 707/766 |
| 8,650,031 B1* | 2/2014 | Mamou et al. | 704/235 |
| 2008/0319990 A1 | 12/2008 | Taranenko et al. | |
| 2009/0024612 A1* | 1/2009 | Tang et al. | 707/5 |
| 2009/0049020 A1 | 2/2009 | Im | |
| 2009/0094227 A1* | 4/2009 | Berkowitz et al. | 707/5 |
| 2009/0106224 A1* | 4/2009 | Roulland et al. | 707/5 |
| 2009/0144234 A1 | 6/2009 | Sharif et al. | |
| 2009/0187515 A1* | 7/2009 | Andrew et al. | 706/12 |
| 2009/0265388 A1* | 10/2009 | Xiao et al. | 707/104.1 |
| 2009/0313237 A1* | 12/2009 | Agrawal et al. | 707/5 |
| 2010/0005061 A1* | 1/2010 | Basco et al. | 707/3 |
| 2010/0205167 A1* | 8/2010 | Tunstall-Pedoe et al. | 707/706 |
| 2010/0235375 A1 | 9/2010 | Sidhu et al. | |
| 2011/0047120 A1 | 2/2011 | Kamvar et al. | |
| 2012/0036123 A1* | 2/2012 | Hasan et al. | 707/723 |
| 2012/0150920 A1* | 6/2012 | Roulland et al. | 707/805 |
| 2012/0166182 A1 | 6/2012 | Ko et al. | |
| 2012/0166468 A1* | 6/2012 | Gupta et al. | 707/768 |
| 2012/0259829 A1* | 10/2012 | Zhou | 707/706 |

(Continued)

OTHER PUBLICATIONS

International Search Report and Written Opinion for International Application No. PCT/US2013/045792, dated Jan. 21, 2014, pp. 1-10.

*Primary Examiner* — Miranda Le
(74) *Attorney, Agent, or Firm* — Marshall, Gerstein & Borun LLP

(57) ABSTRACT

Methods, systems, and apparatus, including computer programs encoded on a computer storage medium, for providing query suggestions. In one aspect, a method includes receiving a search string from a user device. A measure of query completeness is determined for the search string. The measure of query completeness is compared to a threshold measure of query completeness. One or more specific query suggestions are provided to the user device, selected from a plurality of specific query suggestions for the search string, when the measure of query completeness exceeds the threshold measure of query completeness; or one or more general query suggestions are provided to the user device, selected from a plurality of general query suggestions for the search string, when the measure of query completeness does not exceed the threshold measure of query completeness.

23 Claims, 6 Drawing Sheets

(56) References Cited

U.S. PATENT DOCUMENTS

| | | |
|---|---|---|
| 2012/0265779 A1* | 10/2012 | Hsu et al. .................. 707/767 |
| 2012/0265787 A1* | 10/2012 | Hsu et al. .................. 707/780 |
| 2012/0278339 A1* | 11/2012 | Wang ......................... 707/748 |
| 2012/0278350 A1* | 11/2012 | Bhatia et al. ............... 707/767 |
| 2012/0284253 A9 | 11/2012 | Ghosh et al. |
| 2012/0304087 A1 | 11/2012 | Walkin et al. |
| 2013/0066895 A1 | 3/2013 | Choi et al. |
| 2013/0073541 A1 | 3/2013 | Mehanna et al. |
| 2013/0080412 A1 | 3/2013 | Kritt et al. |
| 2013/0197899 A1* | 8/2013 | Roulland et al. ............ 704/9 |

\* cited by examiner

PROVIDING QUERY SUGGESTIONS

BACKGROUND

This specification relates to providing search query suggestions.

Internet search engines provide information about Internet accessible resources (e.g., web pages, images, text documents, multimedia content) that are responsive to a user's search query by returning a set of search results in response to the query. A search result includes, for example, a Uniform Resource Locator (URL) and a snippet of information for resources responsive to a query. Some search engines provide query suggestions to users. For example, a search engine can provide query suggestions to be displayed below a text entry field while a user enters a query into the text entry field, or a search engine can provide query suggestions for a submitted query on a search results web page, e.g., below the search results.

SUMMARY

In general, one innovative aspect of the subject matter described in this specification can be embodied in methods that include the actions of receiving a search string from a user device; determining a measure of query completeness for the search string; comparing the measure of query completeness to a threshold measure of query completeness; and providing one or more specific query suggestions to the user device, selected from a plurality of specific query suggestions for the search string, when the measure of query completeness exceeds the threshold measure of query completeness; or providing one or more general query suggestions to the user device, selected from a plurality of general query suggestions for the search string, when the measure of query completeness does not exceed the threshold measure of query completeness. Other embodiments of this aspect include corresponding systems, apparatus, and computer programs, configured to perform the actions of the methods, encoded on computer storage devices. A system of one or more computers can be configured to perform particular actions by virtue of having software, firmware, hardware, or a combination of them installed on the system that in operation causes or cause the system to perform the actions. One or more computer programs can be configured to perform particular actions by virtue of including instructions that, when executed by data processing apparatus, cause the apparatus to perform the actions.

These and other embodiments can each optionally include one or more of the following features. Providing the one or more selected specific query suggestions or the one or more selected general query suggestions is performed prior to receiving a command from the user device to perform a search using the search string as a query. Determining the measure of query completeness for the search string includes determining a probability of receiving the N most probable query suggestions for the search string, wherein N is an integer greater than zero. Determining the probability of receiving a first one of the N most probable query suggestion includes: determining, from a query log, a plurality of candidate query suggestions based on the search string; determining, from the query log, a count of the number of times the plurality of candidate query suggestions were received and a count of the number of times the first one of the N most probable query suggestions was received; and dividing the count of the number of times the first one of the N most probable query suggestions were received by the count of the number of times the plurality of candidate query suggestions were received. Comparing the measure of query completeness to the threshold measure of query completeness includes comparing the probability of the user selecting the N most probable query suggestions to a threshold probability. Determining the measure of query completeness for the search string includes: selecting a plurality of candidate query suggestions; determining, for each candidate query suggestion, a probability for the candidate query suggestion based on a count in a query log of the number of times that the plurality of candidate query suggestions were submitted as search queries and a count in the query log of the number of times that the candidate query was submitted as a search query; determining, for each candidate query suggestion, a product of the probability of the candidate query suggestion multiplied by a logarithm of the probability of the candidate query suggestion; and summing the determined products of the candidate query suggestions. Selecting the plurality of candidate query suggestions includes selecting the N most probable query suggestions, wherein N is an integer greater than zero. Comparing the measure of query completeness to a threshold measure of query completeness comprises comparing the sum of the determined entropies to a threshold sum. Each specific query suggestion is stored in a query suggestion repository, and wherein the query suggestion repository includes information matching each specific query suggestion to a respective general category, each general category having an associated general query suggestion. Providing one or more general query suggestions further comprises: determining one or more specific query suggestions; determining, from the one or more specific query suggestions, one or more general categories; and determining, from the one or more general categories, one or more general query suggestions. The actions further include: providing instructions to the user device that, when executed by the user device, cause the user device to display a user interface for a mapping application, the user interface including a user interface element for receiving queries from a user and a displayed map; receiving an indication from the user device that a user has selected a query suggestions; and providing instructions to the user device to update the displayed map based on the selected query suggestion. The general query suggestions are category labels and the specific query suggestions are geographic locations, and wherein the general query suggestions are stored in a query repository including data matching each general query suggestion with one or more specific query suggestions.

Particular embodiments of the subject matter described in this specification can be implemented so as to realize one or more of the following advantages. Query suggestions can be chosen for the display for the user according to the completeness of an entered search string. For search strings that are short or non-specific, general query suggestions can be provided to a user, which can be more useful to the user than specific query suggestions that are not likely to be selected by the user. For longer or more specific search strings, specific query suggestions can be provided to a user, which can be useful, for example, so that the user does not have to continue typing a long query.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

A search system receives queries and provides information in response to the queries. The search system provides query suggestions. The search system determines a measure of query completeness for an entered search string and provides general query suggestions if the measure of query completeness is below a threshold or specific query suggestions if the measure of query completeness is above the threshold. One such search system can be a mapping application, as further described below. While the query suggestion feature is described in terms of a mapping application, it can be incorporated into other types of search engines, such as an internet search engine, a database search engine, a book finding search engine, and related types of search engines.

Figure 1A:
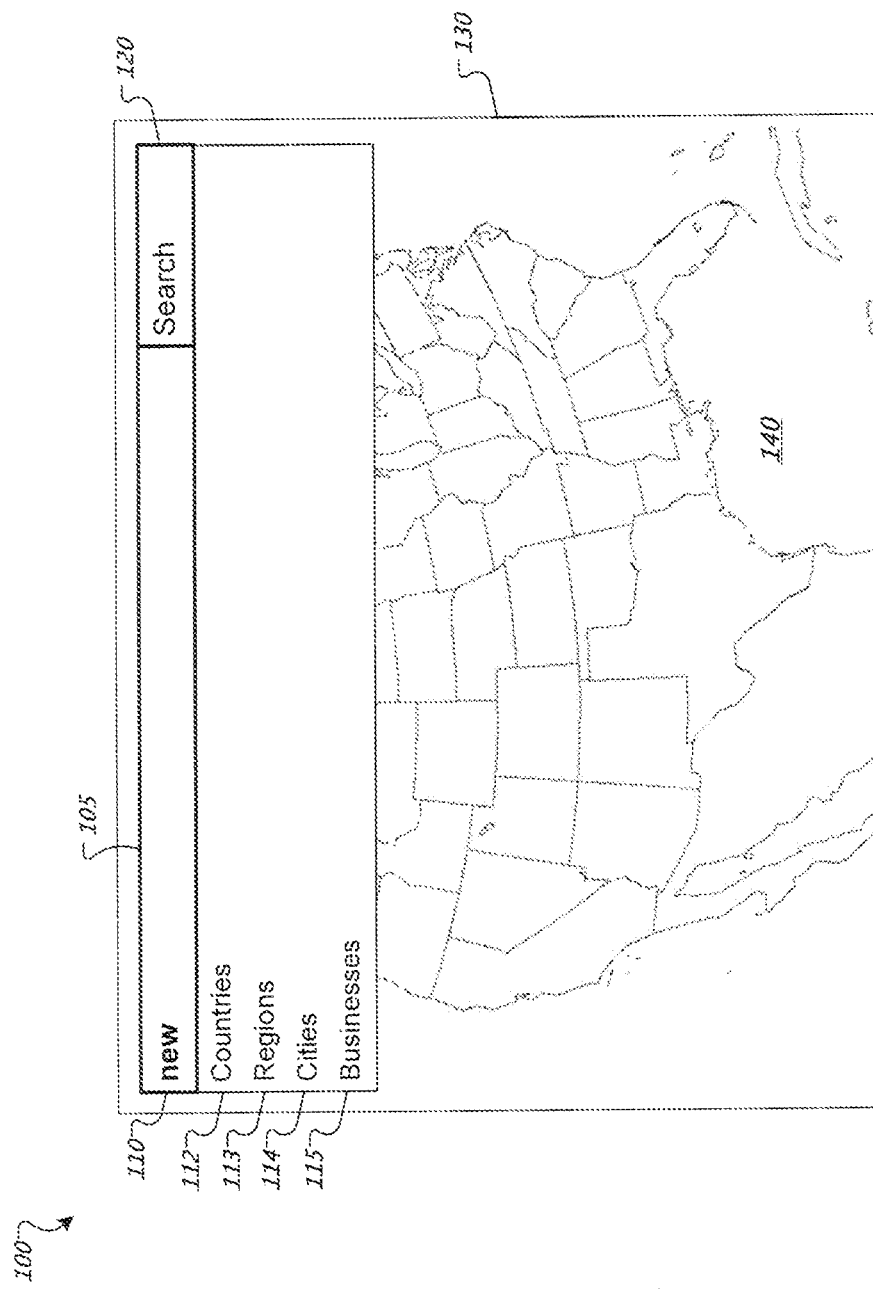
FIGS. 1A-C illustrate a user interface for a mapping application.
Figure 1B:
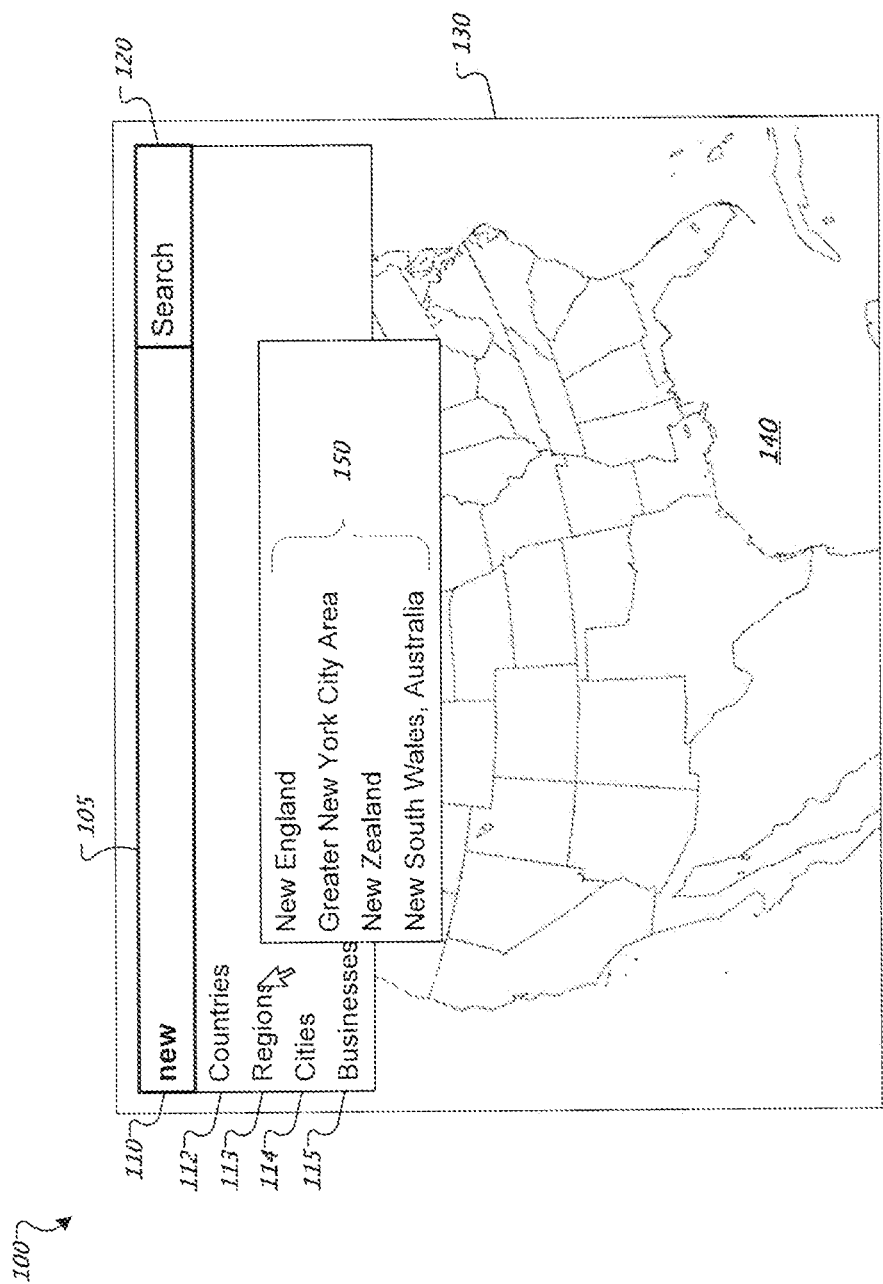
Figure 1C:
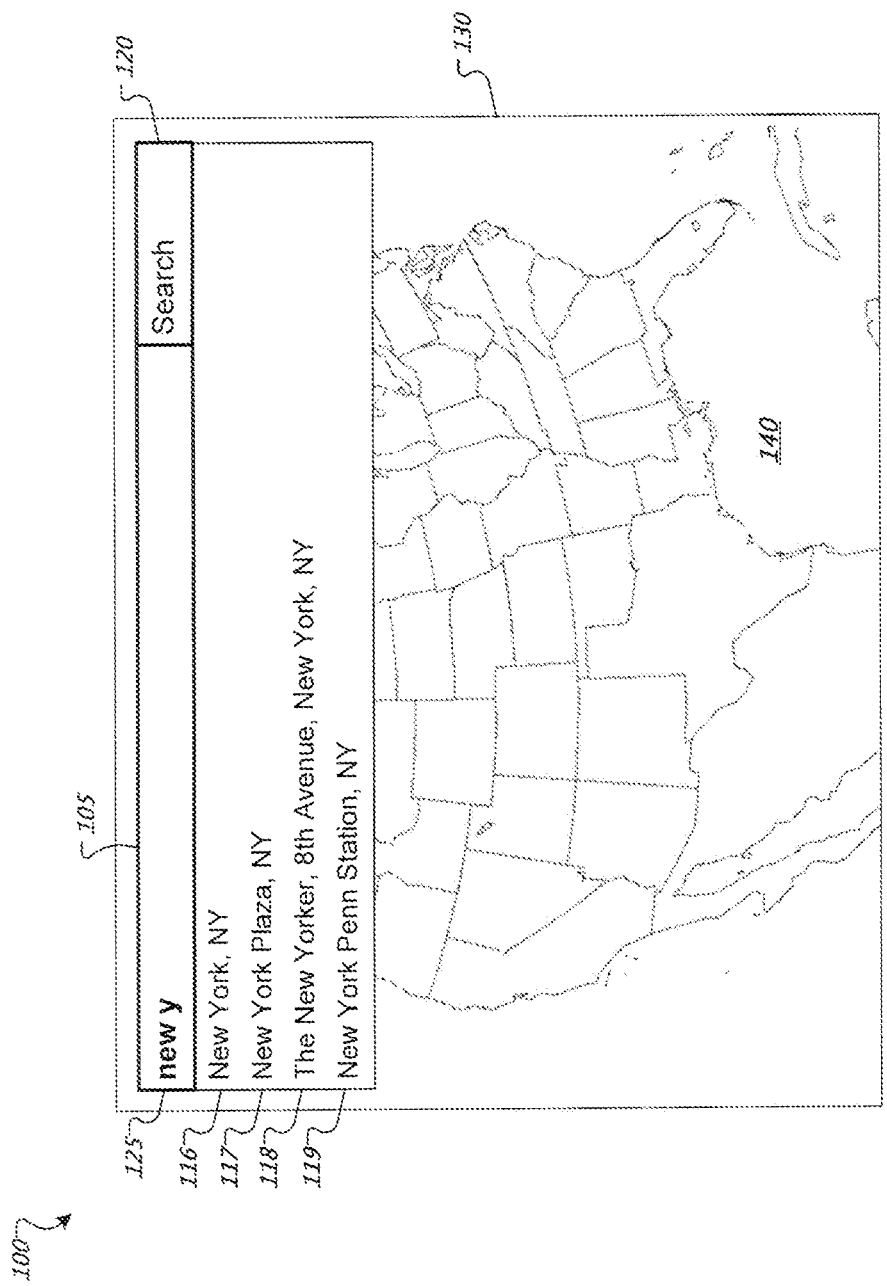

FIGS. 1A-C illustrate a user interface 100 for a mapping application. The user interface can be displayed in a web browser 130 or other application executing on a user device. The mapping application can execute on a server system of one or more computers that communicates with the user device over a data communications network.

The user interface includes a text entry field 105 where a user can enter a search string. The user can submit the search string as a query to the mapping application by performing an explicit action, e.g., by selecting a search button 120 or by tapping an "enter" key on a keyboard. The mapping application identifies geographic entities that satisfy the query in an index of resources and then updates a displayed map 140 so that the map displays indicators at the map locations of the geographic entities. Geographic entities can be, for example, homes, businesses, tourist attractions, political regions, restaurants, and so on. Each geographic entity has an associated location, specified, for example, by an address or latitude and longitude coordinates.

FIG. 1A illustrates an example scenario where the user has entered the search string "new" 110. The user has not expressly submitted the search string, but the user device has sent the search string to the mapping application so that the mapping application can provide query suggestions. If the user interface is a web page displayed by a web browser, for example, the web page can include client-side script code that sends a search string to the mapping application before the user submits the string. The mapping application provides query suggestions 112-115 that the user device can display in a drop down menu below the text entry field. This display operation can also be implemented by client-side script code in a user interface web page, for example. Because the user has not submitted the search string, the query suggestions can be useful to the user, for example, to assist the user in submitting a specific query and finding geographic entities relevant to the user's search.

The mapping application determines a measure of query completeness for the entered search string. If the measure of query completeness is below a threshold, the mapping application provides general query suggestions. If the measure of query completeness is not below the threshold, the mapping application provides specific query suggestions. Determining a measure of query completeness is described further with reference to FIG. 4. General and specific query suggestions are described further with reference to FIG. 2.

In the scenario illustrated in FIG. 1A, the mapping application has determined that the measure of query completeness for the search string "new" is below the threshold. The mapping application has therefore provided general query suggestions 112-115. The general query suggestions in this example are category labels for categories of specific query suggestions. The way the category labels are determined is described more fully below in reference to FIG. 2.

FIG. 1B illustrates an example scenario in which the user has selected one of the general query suggestions 113 by moving a cursor over the general query suggestion. The mapping application can provide specific query suggestions 150 associated with the category referred to by the selected general query suggestion. For example, the user device can display the specific query suggestions in a menu that overlays the drop down menu for the general query suggestions. The user can select one of the specific query suggestions to be submitted to the mapping application, e.g., by clicking on the specific query suggestion. Methods for identifying and displaying both general query suggestions 113 and specific query suggestions 150 are further described below in reference to FIG. 3.

FIG. 1C illustrates an example scenario in which the user, instead of moving a cursor over one of the general query suggestions, has continued to enter characters into the text entry field. The search string 125 in the text entry field is now "new y," and the user still has not submitted the search string as a query to the mapping application. The mapping application has determined that the measure of query completeness for the search string "new y" is above the threshold. The mapping application provides specific query suggestions 116-119 for display in the drop down menu below the text entry field. The user can select one of the specific query suggestions, e.g., by clicking on the specific query suggestion, causing the suggestion to be submitted to the mapping application.

Figure 2:
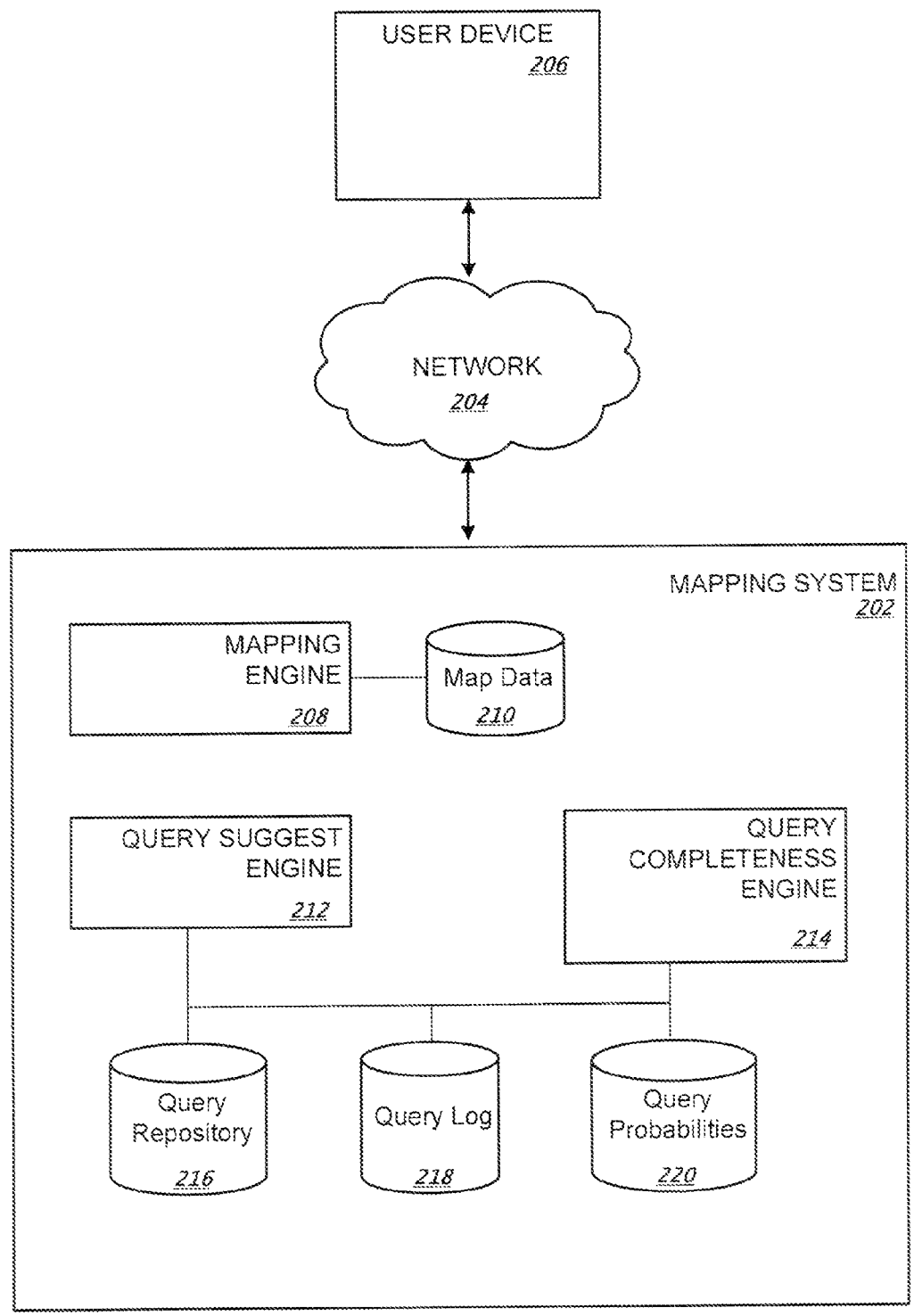
FIG. 2 is a block diagram of a mapping system configured to execute a mapping application and provide query suggestions.

FIG. 2 is a block diagram of a mapping system 202 configured to execute a mapping application and provide query suggestions. The mapping system can be implemented in a system of one or more computers.

The mapping system communicates with a user device 206 over a data communications network 214. A user can send queries to the mapping system using the user device, e.g., using a web browser or other application executing on the user device. The mapping system responds by updating a map in a user interface displayed on the user device, e.g., as described above with reference to FIGS. 1A-C.

The mapping system includes a mapping engine 208. In this specification the term "engine" will be used broadly to refer to a software-based system or subsystem that can perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The mapping engine 208 identifies geographic entities relevant to queries. The mapping engine can rank geographic entities, e.g., by quality, by relevancy to a query, or both. The mapping engine provides maps from a map data repository 210 for display on the user device. The mapping engine can provide maps that include indicators of locations of geographic entities.

The mapping system includes a query suggest engine 212. The query suggest engine generates query suggestions for a search string, e.g., a search string received from the user device. The query suggest engine can generate query suggestions by selecting queries stored in a query repository 216.

The mapping system also includes a query completeness engine. The query completeness engine determines a measure of query completeness for a search string, e.g., a search string received from the user device. The query completeness engine can determine a measure of query completeness using a query log 218, or a repository of query probabilities 220, or both. Determining a measure of query completeness is discussed further with reference to FIG. 4.

The mapping system provides query suggestions using both the query suggest engine and the query completeness engine. The query completeness engine determines a measure of query completeness for a received search string, and the mapping system uses the query suggest engine to provide general query suggestions when the measure of query completeness is below a threshold and specific query suggestions when the measure of query completeness is not below the threshold.

The general query suggestions can be categories associated with specific query suggestions. The specific query suggestions can be, for example, geographic locations as illustrated in FIG. 1A-C. The general query suggestions can be stored in the query repository and associated with one or more specific query suggestions. A general query suggestion can, for example be a category that identifies a type of entity, and the specific query suggestions can be names of specific entities of that category or type.

In some implementations, the general query suggestions have structure, so that the system can combine specific and general parts within the same suggestion. For example consider a query that refers to the name of a street. The system could determine that the street is highly likely to be selected for submission as a query, but that no single house number on the street is highly likely to be selected. The system can generate a specific query suggestion for the street with a [house number here] placeholder. When a user selects such a suggestion, the system provides specific suggestions with house numbers.

In some implementations, the mapping system provides query suggestions having an amount of information that varies based on the measure of query completeness. For example, the mapping system can provide general query suggestions (e.g., search categories such as "hotels" and "restaurants") when the measure of query completeness is low. The mapping system can provide specific query suggestions (e.g., specific hotel and restaurant names) when the measure of query completeness is above a first threshold. And, the mapping system can provide even more detailed specific query suggestions (e.g., hotel or restaurant names together with street addresses, phone numbers, opening hours, etc.) when the measure of query completeness is above a second, even higher threshold. In general, the system can provide for a variable number of query completeness thresholds and associated levels of detail for query suggestions. The query suggestions can be stored in a hierarchy spanning specific query suggestions to general query suggestions, and the mapping system can select more specific query suggestions in the hierarchy as the measure of query completeness rises. Alternatively, each query suggestion can include information at various levels of specificity, ranging from general categories and sub-categories to more particular information such as names, addresses, telephone numbers, and operating hours. The amount of information revealed for a given query suggestion can be based on the measure of query completeness, such that more information is revealed for a given query suggestion when the measure of query completeness is higher.

In some implementations, the query completeness engine determines and stores measures of query completeness for various search strings before search time. At search time, when the mapping system receives a search string, the mapping system can access the stored measure of query completeness for the received search string. In some implementations, the query suggest engine determines and stores general or specific query suggestions for a search string before search time. At search time, when the mapping system receives a search string, the mapping system can provide the stored query suggestions.

Figure 3:
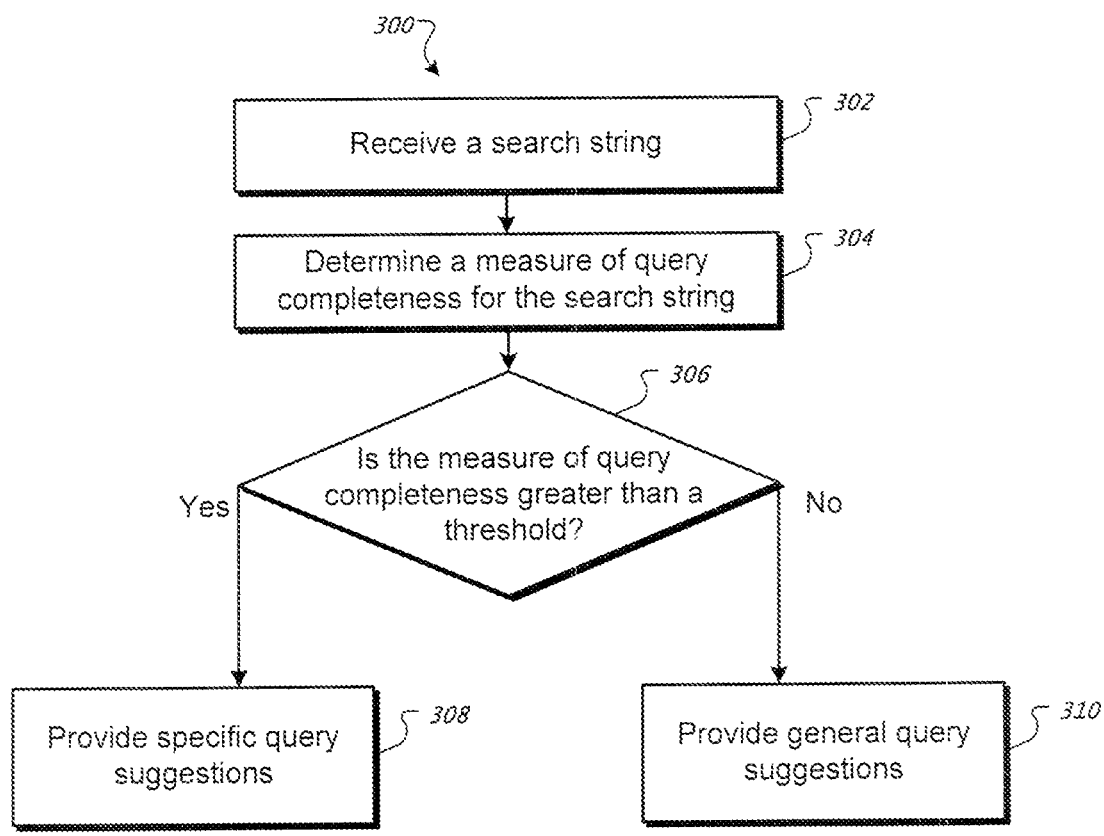
FIG. 3 is a flow diagram of an example process for providing query suggestions.

FIG. 3 is a flow diagram of an example process 300 for providing query suggestions. The mapping system 202 of FIG. 2 can perform the process 300. For convenience, the process will be described with respect to a system that performs the process 300.

The system receives a search string, e.g., from a user device (step 302). For example, the system can receive the search string from a user device displaying the user interface 100 illustrated in FIGS. 1A-C.

The system determines a measure of query completeness for the search string (step 304). For example, the system can determine the measure of query completeness as described below with reference to FIG. 4.

The system determines whether the measure of query completeness is greater than a threshold (step 306). If the measure of query completeness is greater than the threshold, the system provides one or more specific query suggestions to the user device (step 308). If the measure of query completeness is not greater than the threshold, the system provides one or more general query suggestions to the user device (step 310). For example, the system can provide the query suggestions to the user device for display as illustrated in FIGS. 1A-C.

To provide specific query suggestions, the system can provide the top N most probable queries that include the entered search string, for example. The number of specific query suggestions, N, can be the number of available spaces for query suggestions in a user interface element, e.g., the drop down menu of FIG. 1A. Determining the top N most probable specific query suggestions is described further below with reference to FIG. 4.

To provide general query suggestions, the system can determine one or more specific query suggestions, e.g., the top N most probable queries that include the entered search string. The system next determines, from the one or more specific query suggestions, one or more general categories. For example, each specific query suggestion can be stored in a query suggestion repository that includes information associating each specific query suggestion to one or more general categories. From the one or more general categories, the system determines one or more general query suggestions. For example, each general category can have an associated general query suggestion stored in the query repository. Alternatively, the system can determine the top N most probable general categories from all queries that include the entered search string.

Figure 4:
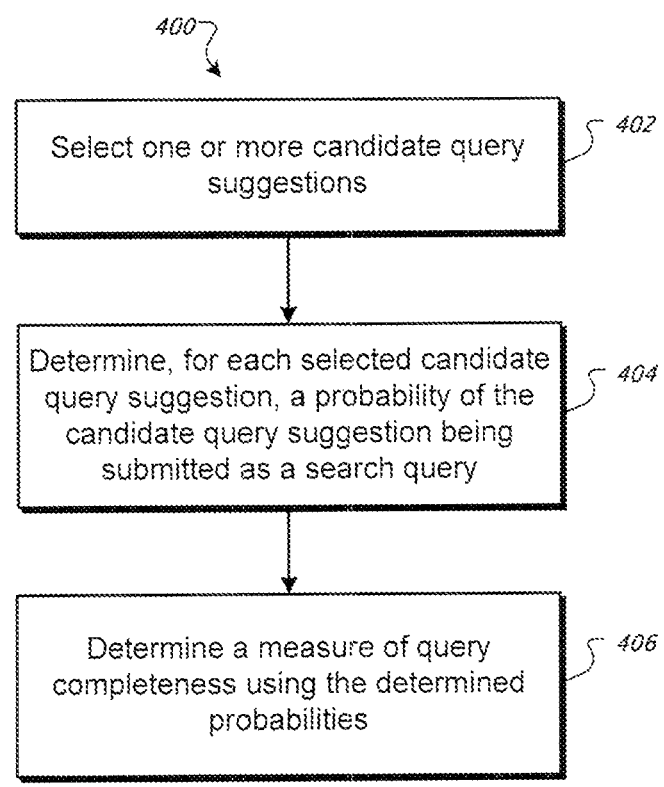
FIG. 4 is a flow diagram of an example process for determining a measure of query completeness for a search string.

FIG. 4 is a flow diagram of an example process 400 for determining a measure of query completeness for a search string, e.g., a search string received from a user device or a search string stored in a query repository of queries submitted by users. The mapping system 202 of FIG. 2 can perform the process 400. For convenience, the process will be described with respect to a system that performs the process 400.

The system selects one or more candidate query suggestions for the search string (step 402). The candidate query suggestions are specific query suggestions. Techniques for selecting candidate query suggestions are known in the art. For example, candidate query suggestions can be all stored queries that begin with or include the search string. The operation of the system does not depend on how the suggestions are selected, as long as the suggestions are selected based on the search string.

The system determines, for each candidate query suggestion, a probability of the candidate query suggestion being submitted by a user as a search query given that the user has entered the search string (step 404). The system can determine the probability from a query log, e.g., the query log 218 of FIG. 2.

Consider a first candidate query suggestion. The system first extracts from the query log a count of the number of times that users submitted any query that has been identified as a candidate query suggestion. For example, where candidate query suggestions are queries that begin with the search string, the system determines from the query log the number of submitted queries that begin with the search string. Next, the system extracts from the query log a count of the number of times that users submitted the first candidate query suggestion.

The system determines the ratio of the count of the number of times that users submitted the first candidate query suggestion to the count of the number of times that users submitted any of the candidate query suggestions. The system can determine the probability for the first candidate query suggestion as that ratio or as a number based on that ratio.

In some implementations, the system determines probabilities based on the frequencies of each term in the query. This is useful, for example, because the system can determine probabilities for a wider range of queries, including queries which are not in the query log, as long as the individual words in the query are in the query log.

After determining the probability, the system can optionally store the probability in a query probability repository, e.g., the query probability repository 220 of FIG. 2. Each entry in the query probability repository contains at least the search string, the candidate query suggestion, and the probability associated with the candidate query suggestion given the search string.

The system determines a measure of query completeness for the search string using the determined probabilities (step 406). The system can determine the measure of query completeness using any of various techniques. Two alternative methods will be described.

Performing a first method, the system selects a most probable query suggestion for the search string. In some implementations, a query suggest engine, e.g., the query suggest engine 212 of FIG. 2, ranks the candidate query suggestions for a given search string. The most probably query suggestion can be the highest ranking candidate query suggestion. The system can use the probability associated with the most probable query suggestion as the measure of query completeness. Alternatively, the system can add the probabilities associated with the N most probable query suggestions for the search string as the measure of query completeness. When the probabilities associated with the most probable or N most probable candidate queries for the search string are high, the user has likely entered the search string in order to search for information responsive to one of those candidate queries.

Performing a second method, the system determines an entropy for the search string. The entropy of a search string refers to a property of the distribution of probabilities of the candidate query suggestions. If the entropy is low, little information is missing from the search string; the search string is nearly complete. To determine an entropy for the search string, the system can determine, for each candidate query suggestion, a product of the probability of the candidate query suggestion multiplied by a logarithm of the probability of the candidate query suggestion. The system then sums the products.

The system uses the sum or a number based on the sum as the measure of query completeness. A high sum indicates that there is a large number of candidate query suggestions for the search string, and that the user is therefore unlikely to select one of the top N candidate query suggestions. The entropy of the search string can be based on the most probable candidate query suggestion or the top N most probable candidate query suggestions.

While the query suggestion engine was described above in terms of a mapping application, it can be used in any application or system in which a user enters a query or portion of a query. The system can determine the measure of query completeness as described, and provide either specific or general query suggestions depending on the measure of completeness. Such systems can include, for example, search engines and databases.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. A computer storage medium can be, or be included in, a computer-readable storage device, a computer-readable storage substrate, a random or serial access memory array or device, or a combination of one or more of them. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's user device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a user device, e.g., for purposes of displaying data to and receiving user input from a user interacting with the user device, which acts as a client. Data generated at the user device, e.g., a result of the user interaction, can be received from the user device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method performed by one or more computers, the method comprising:

receiving a search string from a user device;

selecting a plurality of candidate query suggestions based on the search string;

determining, for each candidate query suggestion, a probability for the candidate query suggestion based on a count in a query log of the number of times that the plurality of candidate query suggestions were submitted as search queries and a count in the query log of the number of times that the candidate query was submitted as a search query;

determining a measure of query completeness for the search string based on an aggregation of the determined probabilities, including determining a probability of receiving the N most probable query suggestions for the search string, wherein N is an integer greater than zero;

comparing the measure of query completeness to a threshold measure of query completeness; and providing one or more specific query suggestions to the user device, selected from a plurality of specific query suggestions for the search string, when the measure of query completeness exceeds the threshold measure of query completeness; or providing one or more general query suggestions to the user device, selected from a plurality of general query suggestions for the search string, when the measure of query completeness does not exceed the threshold measure of query completeness.

2. The method of claim 1, wherein providing the one or more selected specific query suggestions or the one or more selected general query suggestions is performed prior to receiving a command from the user device to perform a search using the search string as a query.

3. The method of claim 1, wherein determining the probability of receiving a first one of the N most probable query suggestion includes:

determining, from the query log, a count of the number of times the plurality of candidate query suggestions were received and a count of the number of times the first one of the N most probable query suggestions was received; and dividing the count of the number of times the first one of the N most probable query suggestions were received by the count of the number of times the plurality of candidate query suggestions were received.

4. The method of claim 1, wherein comparing the measure of query completeness to the threshold measure of query completeness includes comparing the probability of the user selecting the N most probable query suggestions to a threshold probability.

5. The method of claim 1, wherein determining the measure of query completeness for the search string includes:

determining, for each candidate query suggestion, a product of the probability of the candidate query suggestion multiplied by a logarithm of the probability of the candidate query suggestion; and summing the determined products of the candidate query suggestions.

6. The method of claim 1, wherein selecting the plurality of candidate query suggestions includes selecting the N most probable query suggestions, wherein N is an integer greater than zero.

7. The method of claim 1, wherein comparing the measure of query completeness to a threshold measure of query completeness comprises comparing an entropy of the probabilities to a threshold sum.

8. The method of claim 1, wherein each specific query suggestion is stored in a query suggestion repository, and wherein the query suggestion repository includes information matching each specific query suggestion to a respective general category, each general category having an associated general query suggestion.

9. The method of claim 8, wherein providing one or more general query suggestions further comprises:

determining one or more specific query suggestions;

determining, from the one or more specific query suggestions, one or more general categories; and determining, from the one or more general categories, one or more general query suggestions.

10. The method of claim 1, further comprising:

providing instructions to the user device that, when executed by the user device, cause the user device to display a user interface for a mapping application, the user interface including a user interface element for receiving queries from a user and a displayed map;

receiving an indication from the user device that a user has selected a query suggestions; and providing instructions to the user device to update the displayed map based on the selected query suggestion.

11. The method of claim 10, wherein the general query suggestions are category labels and the specific query suggestions are geographic locations, and wherein the general query suggestions are stored in a query repository including data matching each general query suggestion with one or more specific query suggestions.

12. A system of one or more computers configured to perform operations comprising:

receiving a search string from a user device;

selecting a plurality of candidate query suggestions based on the search string;

determining, for each candidate query suggestion, a probability for the candidate query suggestion based on a count in a query log of the number of times that the plurality of candidate query suggestions were submitted as search queries and a count in the query log of the number of times that the candidate query was submitted as a search query; determining, by one or more processors, a measure of query completeness for the search string based on an aggregation of the determined probabilities, including determining a probability of receiving the N most probable query suggestions for the search string, wherein N is an integer greater than zero;

comparing the measure of query completeness to a threshold measure of query completeness; and providing one or more specific query suggestions to the user device, selected from a plurality of specific query suggestions for the search string, when the measure of query completeness exceeds the threshold measure of query completeness; or providing one or more general query suggestions to the user device, selected from a plurality of general query suggestions for the search string, when the measure of query completeness does not exceed the threshold measure of query completeness.

13. The system of claim 12, wherein providing the one or more selected specific query suggestions or the one or more selected general query suggestions is performed prior to receiving a command from the user device to perform a search using the search string as a query.

14. The system of claim 12, wherein determining the probability of receiving a first one of the N most probable query suggestion includes:

determining, from the query log, a count of the number of times the plurality of candidate query suggestions were received and a count of the number of times the first one of the N most probable query suggestions was received; and dividing the count of the number of times the first one of the N most probable query suggestions were received by the count of the number of times the plurality of candidate query suggestions were received.

15. The system of claim 12, wherein comparing the measure of query completeness to the threshold measure of query completeness includes comparing the probability of the user selecting the N most probable query suggestions to a threshold probability.

16. The system of claim 12, wherein determining the measure of query completeness for the search string includes:
   determining, for each candidate query suggestion, a product of the probability of the candidate query suggestion multiplied by a logarithm of the probability of the candidate query suggestion; and
   summing the determined products of the candidate query suggestions.

17. The system of claim 12, wherein selecting the plurality of candidate query suggestions includes selecting the N most probable query suggestions, wherein N is an integer greater than zero.

18. The system of claim 12, wherein comparing the measure of query completeness to a threshold measure of query completeness comprises comparing an entropy of the probabilities to a threshold sum.

19. The system of claim 12, wherein each specific query suggestion is stored in a query suggestion repository, and wherein the query suggestion repository includes information matching each specific query suggestion to a respective general category, each general category having an associated general query suggestion.

20. The system of claim 19, wherein providing one or more general query suggestions further comprises:
   determining one or more specific query suggestions;
   determining, from the one or more specific query suggestions, one or more general categories; and
   determining, from the one or more general categories, one or more general query suggestions.

21. The system of claim 12, the operations further comprising:
   providing instructions to the user device that, when executed by the user device, cause the user device to display a user interface for a mapping application, the user interface including a user interface element for receiving queries from a user and a displayed map;
   receiving an indication from the user device that a user has selected a query suggestions; and
   providing instructions to the user device to update the displayed map based on the selected query suggestion.

22. The system of claim 21, wherein the general query suggestions are category labels and the specific query suggestions are geographic locations, and wherein the general query suggestions are stored in a query repository including data matching each general query suggestion with one or more specific query suggestions.

23. A non-transitory computer storage medium encoded with a computer program, the program comprising instructions that when executed by one or more computers cause the one or more computers to perform operations comprising:
   receiving a search string from a user device;
   selecting a plurality of candidate query suggestions based on the search string;
   determining, for each candidate query suggestion, a probability for the candidate query suggestion based on a count in a query log of the number of times that the plurality of candidate query suggestions were submitted as search queries and a count in the query log of the number of times that the candidate query was submitted as a search query;
   determining a measure of query completeness for the search string based on an aggregation of the determined probabilities, including determining a probability of receiving the N most probable query suggestions for the search string, wherein N is an integer greater than zero;
   comparing the measure of query completeness to a threshold measure of query completeness; and
   providing one or more specific query suggestions to the user device, selected from a plurality of specific query suggestions for the search string, when the measure of query completeness exceeds the threshold measure of query completeness; or
   providing one or more general query suggestions to the user device, selected from a plurality of general query suggestions for the search string, when the measure of query completeness does not exceed the threshold measure of query completeness.

* * * * *